US012588777B2

(12) United States Patent
Morales et al.

(10) Patent No.: US 12,588,777 B2
(45) Date of Patent: Mar. 31, 2026

(54) PAPER AIMED AT FORMING A U-STRAW

(71) Applicant: Ahlstrom Oyj, Helsinki (FI)

(72) Inventors: Bertrand Morales, Saint-Sauveur-de-Bergerac (FR); John Blanz, Mosinee, WI (US)

(73) Assignee: AHLSTROM OYJ, Helsinki (FI)

( * ) Notice: Subject to any disclaimer, the term of this patent is extended or adjusted under 35 U.S.C. 154(b) by 749 days.

(21) Appl. No.: 17/796,193

(22) PCT Filed: Feb. 1, 2021

(86) PCT No.: PCT/FI2021/050066
§ 371 (c)(1),
(2) Date: Jul. 28, 2022

(87) PCT Pub. No.: WO2021/152221
PCT Pub. Date: Aug. 5, 2021

(65) Prior Publication Data
US 2023/0072990 A1      Mar. 9, 2023

Related U.S. Application Data

(60) Provisional application No. 62/967,658, filed on Jan. 30, 2020.

(30) Foreign Application Priority Data

Apr. 30, 2020      (EP) ..................................... 20172382

(51) Int. Cl.
| | |
|---|---|
| *A47G 21/18* | (2006.01) |
| *B32B 7/12* | (2006.01) |
| *B32B 29/00* | (2006.01) |
| *D21H 15/00* | (2006.01) |
| *D21H 21/16* | (2006.01) |
| *D21H 21/20* | (2006.01) |

(52) U.S. Cl.
CPC ............... *A47G 21/18* (2013.01); *B32B 7/12* (2013.01); *B32B 29/005* (2013.01); *D21H 15/00* (2013.01); *D21H 21/16* (2013.01); *D21H 21/20* (2013.01); *B32B 2250/02* (2013.01); *B32B 2250/03* (2013.01); *B32B 2250/26* (2013.01); *B32B 2255/12* (2013.01); *B32B 2307/54* (2013.01); *B32B 2307/5825* (2013.01); *B32B 2307/7163* (2013.01); *B32B 2307/718* (2013.01); *B32B 2307/7265*

(2013.01); *B32B 2307/732* (2013.01); *B32B 2554/00* (2013.01); *B32B 2597/00* (2013.01)

(58) Field of Classification Search
CPC ................................ D21H 13/06; A47G 21/18
USPC ............................................. 162/97; 220/705
See application file for complete search history.

(56) References Cited

U.S. PATENT DOCUMENTS

| | | | |
|---|---|---|---|
| 2010/0116138 A1* | 5/2010 | Guimond ........... | B01D 39/1615 |
| | | | 55/528 |
| 2018/0235390 A1 | 8/2018 | Lehmann | |
| 2019/0249369 A1 | 8/2019 | Segal | |
| 2019/0313819 A1 | 10/2019 | Li | |
| 2020/0063349 A1* | 2/2020 | Parker ................... | D21H 15/04 |

FOREIGN PATENT DOCUMENTS

| | | |
|---|---|---|
| CN | 102134819 A | 7/2011 |
| CN | 109371743 A | 2/2019 |
| CN | 109431212 A | 3/2019 |
| CN | 109463964 A | 3/2019 |
| CN | 109594408 A | 4/2019 |
| JP | 3223685 U | 10/2019 |

OTHER PUBLICATIONS

International Search Report for International Application No. PCT/FI2021/050066; International Filing Date Feb. 1, 2021; Date of Mailing Apr. 8, 2021; 5 pages.
Written Opinion for International Application No. PCT/FI2021/050066; International Filing Date Feb. 1, 2021; Date of Mailing Apr. 8, 2021; 6 pages.

* cited by examiner

*Primary Examiner* — Jacob T Minskey
(74) *Attorney, Agent, or Firm* — CANTOR COLBURN LLP

(57) ABSTRACT

The invention relates to drinking U-straws and more particularly to a paper for manufacturing drinking U-straws, which is environmental friendly, bio-degradable and is able to be formed in the shape of a bent straw with an accordion-like structure at the bend. The paper has high water resistance as well as high strength and elongation properties compatible with the intended use. In particular, the paper for forming a U-straw includes: •between 10 and 50 dry wt % of first fibers having a length of between 1.4 mm and 2.5 mm; •between 40 and 80 dry wt % of second fibers having a length of between 0.3 mm and 0.8 mm; and •between 1 and 6 dry wt % of a sizing agent.

11 Claims, No Drawings

PAPER AIMED AT FORMING A U-STRAW

CROSS REFERENCE TO RELATED APPLICATIONS

This application is a National Stage application of PCT/FI2021/050066, filed Feb. 1, 2021, which claims the benefit of European Application No. 20172382.2, filed Apr. 30, 2020, and U.S. Provisional Application No. 62/967,658, filed Jan. 30, 2020, each of which are incorporated by reference in their entireties herein.

FIELD OF THE INVENTION

The invention relates to drinking U-straws, and more particularly to a novel paper for manufacturing drinking U-straws, which is environmental friendly, bio-degradable and is able to be formed in the shape of a bent straw with an accordion-like structure at the bend. The paper has high water resistance, as well as high strength and elongation properties compatible with the intended use.

BACKGROUND

Straws are widely used for drinking beverages such as, for example, sodas, for hygiene and convenience purposes. Indeed, if the liquid is in a can, it can be useful to avoid the direct contact between the mouth and the can for hygiene purposes. Moreover, it has been demonstrated that the use of straws for soda enables one to limit the contact surface between the soda and the teeth and also prevents the formation of dental cavities due to the sugar contained in the sodas.

Conventional drinking straws are made of plastic material and are intended for single use. This kind of plastic material is too light and does not contain enough raw material to make it environmentally and economically viable. Nowadays, the best way to extract value from these straws is to throw them in the traditional trash to recover the heat energy at the time of incineration. The problem is that the incineration is especially costly. Consequently, there are large amounts of light plastic, which are stocked in controlled landfills, particularly in wealthier countries. Moreover, such plastic straws are often thrown away in the nature by the user, and thus become a source of pollution in rivers, seas, woods, etc., and may also be harmful for aquatic or terrestrial flora and fauna.

Furthermore, some countries are nowadays looking for removing as much plastic as possible from daily use elements, such as the plastic straws. It is also necessary to find a material able to replace the plastic for making straws.

There is also a need to develop straw materials that are environmental friendly and further having less expensive treatment processes, as well as presenting physical and mechanical properties compatible with a use in wet conditions, in particular regarding the integrity of the material during a predetermined time.

In order to solve this problem, drinking straws made of paper have been developed.

Paper straws should have a sufficient mechanical resistance for being used in a liquid, i.e. having a capacity to absorb water without being degraded.

For example, US2018235390 (A1) discloses straight straws, which are formed from paperboard sheets constituted of rapidly renewable resources and are recyclable, biodegradable and compostable. The paperboard sheets are constituted of bamboo, bagasse, reed or any combination or singularity thereof.

CN109463964 (A) discloses a paper straight straw comprising a first paper layer, a wax layer or wax mixture layer covering the first paper layer, and a second paper layer covering the wax layer or wax mixture layer.

DE 202018105665 U1 discloses an environmental friendly and sustainable paper straw. However, food-grade laminate or edible wax is applied to give the straw liquid repellency properties in this document. Those additional components increase the final price of this straw, as well as the number of manufacturing steps.

US 2019/0249369 A1 discloses a straw for drinking beverages, comprising a waterproof tube of paper having an inner surface; and a layer of a composition being disposed over said inner surface. The composition includes plant derived wax to waterproof cellulose based materials.

Most of the time, the waterproof properties of the paper require the coating of additional layers, especially made of wax, that increase the cost of manufacturing. The waterproof properties in the meaning of the invention refer to the capacity of the paper to absorb the water. This parameter is typically measured by a Cobb test.

These additional coatings disclosed in the prior art documents have some drawbacks.

First, they make the different layers of the straw to adhere inadequately to each other due to the incompatibility with the adhesive/glue.

Second, printing is not possible on the wax. Therefore, one option is to not apply a wax layer and to print directly on the paper. The problem is that the waterproof properties of the straw are decreased. A second option is to not apply a wax layer and to print directly on the paper and to apply another layer on the printing in order to get some satisfying waterproof properties. This second option is obviously costly.

Nowadays and as identified in the prior art documents, there exist many paper-based straight straws. However, there is a need to develop paper-based U-straws, that is to say straws having an accordion-shaped pivot for convenience of the final user. The mechanical resistance of U-shape drinking straws is even more difficult to reach especially along the accordion area of the straw, which combines both flexibility and contact with liquid. Moreover, the formation of this pivoting area requires the paper to have specific physical and mechanical properties, especially like elongation in order to prevent tearing of the paper during the formation of the U-part of the straw.

Therefore, aspects of the present invention are aimed at least at proposing a paper for manufacturing U-shape drinking straws which has mechanical properties enabling the formation of the accordion area and which is easy to process in conventional installation. Another aspect is also aimed at proposing a straw having waterproofing properties compatible with a use of drinking U-shaped straws without requiring the use of specific coatings like wax layers. A further aspect is aimed at proposing a paper which is directly printable. Another aspect is aimed at proposing a paper which is biodegradable and also environmental friendly.

In order to solve, at least partly, the problems listed here-above, the applicant has developed a composition, which enables obtaining some specific values of tensile strength and cobb strength to meet requirements to use the paper for U-straws and comply with the process requirement for forming the accordion area of the U-straw.

SUMMARY OF THE INVENTION

In one aspect of the present invention, there is disclosed a paper for forming a U-Straw. The paper is characterized in that it comprises:

between 10 and 50 dry wt % of first fibers having a length comprised between 1.4 mm and 2.5 mm;

between 40 and 80 dry wt % of second fibers having a length comprised between 0.3 mm and 0.8 mm; and between 1 and 6 dry wt % of a sizing agent; said paper having:

an elongation in the Cross Direction comprised between 4 and 8%.

The recipe disclosed here-above provides a paper having mechanical and physical characteristics required for a use for a straw. More particularly, this recipe enables to obtain a paper having an elongation in the Cross Direction high enough to enable the formation of the accordion portion of the U-straw without tearing of the paper during the formation of this accordion part, and also ensures the integrity thereof when exposed to liquids. In addition, the recipe further enables the paper to have high wet resistance (also referred to as water resistance) to retain structural integrity when in contact with liquids, and be able to function as a straw. Using this recipe, paper of sufficient tensile strength is obtained for use as a straw. As will be explained in further paragraphs, one or more layers of the paper may be used in construction of the straw.

The paper aimed at forming a U-straw may further present one or more of the following technical features taken alone or in combination.

In an embodiment, the paper of the invention may comprise a Cobb Water resistance of between 15 and 34 gsm. This Cobb Water Resistance is measured according to ISO 535.

According to a specific embodiment, the paper may comprise between 0.5 and 1.5 dry wt % of at least a wet strength agent. In some embodiments, the paper may not comprise a wet strength agent.

The paper has a Machine Direction and a Cross Direction. The paper may further have a tensile strength in the Machine Direction comprised between 3 and 9 KN/m. The tensile strength in the Machine and in the Cross Directions is measured according to ISO 1924.

The paper may have a tensile strength in the Cross Direction comprised between 0.8 and 5 KN/m. In particular embodiments, the tensile strength in the Cross Direction may be between 0.8 to below 1.2 KN/m. This lower tensile strength range is typically seen with lighter and thinner papers in accordance with the present invention yet still provide ample tensile strength for use in a U-straw. In other embodiments, the tensile strength in the Cross Direction may be between 1.2 to 5 KN/m. Higher tensile strength is helpful during high speed processing and converting of the paper in the shape of a U straw.

The paper may have an elongation in the Cross Direction of between 4 and 8%, and preferably between 5 and 7% measured according to ISO 1924-5. Such elongation in the Cross Direction enables the paper to be pressed without breaking to enable the formation of the U-part of the U-straw.

The paper may have an elongation in the Machine Direction comprised between 2 and 4%, and preferably comprised between 2.4 and 3.5% measured according to ISO 1924-5.

In a specific embodiment, the paper may contain broke, the weight content of the broke being comprised between 0.5 and 20 dry wt %. In some embodiments, the paper may not comprise any broke.

The paper may further comprise at least a filler. The filler is advantageously chosen among talcum or calcium carbonate.

According to a particular embodiment, the paper of the invention may further contain starch, said starch being present in the paper in an amount of at most 1 dry wt %.

The paper includes between 1 and 6 dry wt % of a sizing agent. In an embodiment, the paper according to the invention may also preferably contain alkylketendimer (AKD) based wax, as a sizing agent.

According to a particular embodiment, the sizing agent may further contain sodium carbonate, said sodium carbonate being present in the sizing agent in an amount of at most 2 dry wt %. The present inventors surprisingly noticed that the presence of sodium carbonate was preventing the deposit of AKD in the tank where the preparation was made and was allowing the catalysis of AKD in the drying part of the installation.

Optionally, the paper may comprise a wet strength agent. In an embodiment, the wet strength agent may comprise polyamine epichlorhydrine (PAE) or formaldehyde is preferred when a wet strength agent is provided.

In a specific embodiment, the paper may comprise at least one of the following features:

the length of the first fibers is comprised between 1.6 mm and 1.8 mm, the length of the second fibers is comprised between 0.5 mm and 0.7 mm.

The paper may have a thickness of between 40 μm and 200 μm. In an embodiment, the paper may have a thickness of between 65 μm and 190 μm.

In order to improve the strength of the paper, said paper may have a tear strength in the Machine Direction of between 45 g and 140 g and/or a tear strength in the Cross Direction of between 45 g and 140 g measured according to the ASTM D 412 method.

In an embodiment, the paper may comprise at least one of the two following characteristics:

a wet burst between 55 Kpa and 200 Kpa measured according to ISO3689, a grammage between 30-140 gsm measured according to ISO536.

In another embodiment, the paper may comprise at least one of the two following characteristics:

a wet burst between 55 Kpa and 200 Kpa measured according to ISO3689, a grammage between 60-140 gsm measured according to ISO536.

Aspects of the present invention further relate to a U-straw made of at least one layer of the paper defined here-above.

Advantageously, the use of the paper described herein for forming the U-straw enables one to prevent the tearing of this paper during the formation of the accordion part forming the pivot part of the straw. Moreover, the paper presenting the characteristics defined here-above enables the accordion-part of the U-straw to have also the mechanical and physical properties to prevent the collapsing of the paper in wet conditions.

In a first embodiment, the U-straw is made of three layers of the paper. The layers form a laminate and are adhered together by a food-compatible glue.

The inventors have found that particularly satisfying results were obtained when the U-straw is made of an outer layer having a grammage of 60 gsm, an inner layer having a grammage of 60 gsm and an intermediate layer having a grammage of 120 gsm, said intermediate layer being disposed between the inner and the outer layers.

In this embodiment, the paper forming the outer layer has a porosity of between 360 ml/min and 800 ml/min and/or the inner layer has a porosity of between 360 ml/min and 800 ml/min, measured according to ISO5636-3.

In a second embodiment, the U-straw is made of two layers of a paper as described herein, respectively an inner layer and an outer layer. The layers form a laminate and are adhered together by a food-compatible glue.

In this embodiment, particularly satisfying results are obtained when the U-straw is made of an outer layer having a grammage of 80 gsm and an inner layer having a grammage of 140 gsm. Advantageously, the outer layer has a porosity of between 360 ml/min and 800 ml/min measured according to ISO5636-3.

Other advantages and characteristics of the present invention will appear more clearly in the following description given in an illustrative way and not limitative one.

In the following specification it is referred to first and second fibers. Those terms "first" and "second" are only used to distinguish two elements that are close but not identical.

Those terms are not intended to define a priority between those features or a disposition in the space or the time. Moreover, it is possible to switch those terms without jeopardizing the following description.

Furthermore, it is referred to an "inner" and an "outer" layer in the following specification. Those terms are generic terms used to better identify the position of those layer in the U-straw structure and are not intended to limit the disclosure of the present invention. Moreover, those terms can be switched without impacting the following disclosure.

DETAILED DESCRIPTION

Aspects of the present invention relate to a paper for forming a U-straw made of at least one layer of said paper. The paper comprises at least between 10 and 50 dry wt % of first fibers, between 40 and 80 dry wt % of second fibers, and between 1 and 6 dry wt % of a sizing agent. Unless otherwise specified, weight percentages or dry weight percentages disclosed herein are relative to the full composition of the paper (the full composition of the paper making 100 dry wt %). Moreover, in particular embodiments, the paper has a thickness comprised between 40 μm and 190 μm and a grammage comprised between 30 gsm and 140 gsm, preferably a thickness comprised between 65 μm and 190 μm and a grammage comprised between 60 gsm and 140 gsm. Optionally, the paper can contain between 0.5 and 1.5 dry wt % of a wet strength agent.

In an embodiment, the composition for the paper enables this paper to have a tensile strength in the Cross Direction comprised between 0.8 and 5 KN/m, preferably between 1.2 and 5 KN/m and/or an elongation in the Cross Direction comprised between 4 and 8%, and more preferably an elongation comprised between 5 and 7%. Such tensile strength in the Cross Direction and elongation in the Cross Direction enable a paper having sufficient strength to form the accordion part of the U-straw. That is to say the paper will resist to the compression applied for forming this accordion part without tearing and this paper will further have a sufficient strength for preventing any collapsing of the U-straw formed with this paper. Moreover, such composition of the paper enables one to have a Cobb Water Resistance on one side (for example wire side) of between 15 and 34 gsm and a Cobb Water Resistance on another side (for example felt side) of between 15 and 34 gsm, both value of Cobb Water Resistance being identical or not. The Cobb Water Resistances are measured according to ISO 535. Such Cobb Water Resistances enable the paper to be used for U-straws as such values will enable to ensure the integrity of the paper in wet conditions during the general time-use of such straws. Indeed, the general time of use of a straw is of 20 minutes approximately. It is also necessary for the paper for forming the U-straw to have a water resistance high enough to prevent any dissolution or collapsing or any other degradation of this paper during at least 30 minutes when in contact with water. Such values for the Cobb Water Resistances enable the paper to meet those requirements.

Moreover, the paper made of this composition may present an elongation in the Machine Direction comprised between 2 and 4%, and more preferably comprised between 2.4 and 3.5%. Such elongation characteristics enable the paper when forming the U-straw to prevent any tearing of the accordion part forming the pivoting part of the straw during its use. Moreover, such elongation characteristics help to prevent the tearing of the paper during the formation of the accordion part of the U-straw. Furthermore, the paper may present a tensile strength in the Machine Direction comprised between 3 and 9 KN/m. The tensile strengths in the Machine and in the Cross Directions are measured according to ISO 1924. Then, the paper has a tear strength in Machine Direction comprised between 45 grams and 140 g and a tear strength in the Cross Direction also comprised between 45 grams and 140 grams. Such tears in the Machine and Cross Directions also contribute to the preventing of tearing of this paper during the formation of the accordion part of the U-straw as well as the resistance to tearing during the pivoting of the straw parts as well as during the use of this U-straw for drinking a beverage.

Furthermore, the paper can be refined to a Schopper comprised between 45 and 50° SR. The paper may further have a wet burst comprised between 55 KPa and 200 KPa. Such values for the wet burst of the paper enable this paper to have a water resistance compatible with a use for forming a U-straw aimed at being exposed to water. It also prevents the collapsing of this U-straw in wet conditions.

The first fibers have a length comprised between 1.4 mm and 2.5 mm, and preferably comprised between 1.6 mm and 1.8 mm. The first fibers can be, for example, chosen among softwood fibers such as Northern Bleached Softwood Kraft (NBSK) or Southern Bleached Softwood Kraft pulp. Other types of softwood pulp or even unbleached softwood pulps may also be used.

Moreover, the second fibers have a length comprised between 0.3 mm and 0.8 mm, and more preferably comprised between 0.5 mm and 0.7 mm. Those second fibers can be for example chosen among hardwood fibers such as *Eucalyptus*, or Nothern Bleached Hardwood Kraft (NBHK) or Southern Bleached Hardwood Kraft pulp. Other types of hardwood pulp or even unbleached hardwood pulps may also be used.

In some embodiments, the paper may contain more than two types of fibers, e.g., additional third and/or fourth fibers, and so on. The additional fibers may comprise any suitable type of fibers of a different material from the first and second type of fibers. In certain embodiments, the additional fibers may comprise PCW (post-consumer waste) pulp, and/or any other form of recycled pulp which may be food grade, or may comprise non-wood fibers.

The sizing agent can be an alkylketendimer (AKD), an alkenyl succinic anhydride (ASA), and/or a rosin-based sizing agent. Alternatively, the sizing agent may include SMA (styrene maleic anhydride), SAE (styrene acrylic emulsion), SAA (styrene acrylic acid), EAA (ethylene acrylic acid), polyesters, polyethylene, combinations, thereof, or any other suitable materials. In certain embodiments, the sizing agent may be applied at the surface of the paper.

The sizing agent enables one to obtain a Cobb Water Resistance compatible with the requirements for a use of this paper for forming a U-straw. According to a particular embodiment, small amounts, typically at most 2 dry wt %, of sodium carbonate can be added to the sizing agent. The addition of sodium carbonate enables to catalyze the AKD in the drying part of the paper machine during the formation of this paper. Accordingly, the use of sodium carbonate enables to increase the production speed of the paper.

Advantageously, the inclusion of the sizing agent in the composition of the paper enables to withdraw the wax layer applied in the prior art and also enables the printing of this paper.

Moreover, the wet strength agent can be chosen among polyamine epichlorhydrine (PAE), glyoxylated resins (GPAM—glyoxylated polyacrylamide), or formaldehyde-based resins. The formaldehyde-based resins may be selected amongst urea formaldehyde-based and melamine formaldehyde-based resins. This wet strength agent contributes to the resistance of the paper in wet conditions.

According to a specific embodiment, the paper may further contain between 0.5 and 20 dry wt % broke. The broke corresponds to recycled parts of paper obtained at the beginning or the end of the processing of the paper. Those parts of the produced paper are generally wrinkled and can also not been used. Such broke can also be considered as recycled paper from paper manufacturing process. The use of such broke also enables to reduce the production costs of this paper.

Moreover, optionally or in addition, the paper may comprise at least one filler, for example, chosen among talcum or calcium carbonate. Such fillers can also influence the whiteness and the opacity of the paper and can further reduce production costs. The at least one filler is present in the paper composition in an amount of at most 7 dry wt %.

Optionally, the paper can comprise at most 1 dry wt % starch. The use of starch in the composition of the paper is for wet end purposes. More particularly, starch improves the strength of the paper during the wet end process and also improves the runnability of the manufacturing process.

The paper may be manufactured by known methods. In an embodiment, at least the first and second fibers are introduced in a chest and water is added to bring those fibers into suspension. Optionally, the sizing agent, the wet strength agent, the filler, and/or the starch can be added to the chest in the case were those agents are present in the mass of the paper. The suspension obtained is then generally refined and is then distributed on a forming wire to form a layer. During the conveying of the dispersion containing at least the first and second fibers, some water is removed by drainage. The layer obtained passes then in a press section, that is to say is pressed between two cylinders, to further enable the removing of water from the layer. The press section can contain more than one workstation composed by two cylinders. In such a case, the pressure applied to the layer at each workstation is increased to dry the layer by pressing it. At the end of the press section, a layer of paper is obtained.

The manufacturing process can also contain a size-pressing step. This size-pressing step is performed once the layer of paper is obtained. Indeed, the sizing agent can be added to the paper by size-press during this step. Furthermore, the manufacturing process can also implement a calandering step performed after the size-pressing step. This calandering step enables to reduce the thickness, or the porosity, or increases the smoothness of the paper. Optionally or in addition, the manufacturing process can further contain a coating step. This coating step can consist of a deposition of pigments or fillers to further increase the smoothness of the paper to improve printing properties of this paper for example.

In the following, some specific recipes are presented, one concerning a paper having a grammage of 60 gsm and another one having a grammage of 120 gsm, a third one having a grammage of 80 gsm, a fourth one having a grammage of 80 gsm made without any wet strength agent, and a fifth one have a grammage of 34 gsm.

First Recipe: Preparation of a Paper Having a Grammage of 60 Gsm

According to this first recipe, the paper is made of the components listed in the table below:

| Component | First fibers (NBSK) | Second fibers (eucalyptus) | Broke | Sizing agent (Fennosize KD 370 M) | Wet strength agent (Resine PAE Kymene 20X cell) |
|---|---|---|---|---|---|
| Dry wt % | 32 | 55 | 11 | 1.19 | 0.66 |

Technical properties of the paper obtained with this first recipe are the following:

| Property | Unit | Value |
|---|---|---|
| Thickness | μm | 69 |
| Elongation Machine Direction | % | 2.8 |
| Elongation Cross Direction | % | 6.2 |
| Tensile Strength Machine Direction | KN/m | 4.2 |
| Tensile Strength Cross Direction | KN/m | 2.7 |
| Wet burst | KPa | 55 |
| Cobb Water Resistance wire side | gsm | 17 |
| Cobb Water Resistance felt side | gsm | 17 |
| Tear Machine Direction | g | 58 |
| Tear Cross Direction | g | 60 |

Second Recipe: Preparation of a Paper Having a Grammage of 120 Gsm

According to this second recipe, the paper is made of the components listed in the table below:

| Component | First fibers (NBSK) | Second fibers (eucalyptus) | Broke | Filler (Talc 0 vrac) | Sizing agent (Fennosize KD 370M) | Wet strength agent (Resine PAE Kymene 20X cell) |
|---|---|---|---|---|---|---|
| Dry wt % | 15 | 68 | 10 | 4.5 | 1.79 | 0.71 |

Technical properties of the paper obtained with this second recipe are the following:

| Property | Unit | Value |
|---|---|---|
| Thickness | μm | 165 |
| Elongation Machine Direction | % | 2.1 |
| Elongation Cross Direction | % | 6.5 |
| Tensile Strength Machine Direction | KN/m | 6 |
| Tensile Strength Cross Direction | KN/m | 3.4 |
| Wet burst | KPa | 60 |
| Cobb Water Resistance wire side | gsm | 17 |
| Cobb Water Resistance felt side | gsm | 17 |
| Tear Machine Direction | g | 110 |
| Tear Cross Direction | g | 116 |

Third Recipe: Preparation of a Paper Having a Grammage of 80 Gsm

According to a third recipe, the paper is made of the components listed in the table below:

| Component | First fibers (NBSK) | Second fibers (NBHK) | Broke | Starch | Sizing agent (AKD) | Wet strength agent (PAE) |
|---|---|---|---|---|---|---|
| Dry wt % | 44 | 44 | 10 | 0.5 | 0.5 | 1 |

Technical properties of the paper obtained with this third recipe are the following:

| Property | Unit | Value |
|---|---|---|
| Thickness | μm | 80 |
| Elongation Machine Direction | % | 2.1 |
| Elongation Cross Direction | % | 6.5 |
| Tensile Strength Machine Direction | KN/m | 5.8 |
| Tensile Strength Cross Direction | KN/m | 3.7 |
| Wet burst | KPa | 60 |
| Cobb Water Resistance wire side | gsm | 20 |
| Cobb Water Resistance felt side | gsm | 20 |
| Tear Machine Direction | g | 65 |
| Tear Cross Direction | g | 80 |

Fourth Recipe: Preparation of a Paper Having a Grammage of 80 Gsm

According to this fourth recipe, a paper is prepared without any wet strength agent in the composition. More particularly, the paper is made of the components listed in the table below:

| Component | First fibers (NBSK) | Second fibers (NBHK) | Broke | Starch | Sizing agent (AKD) |
|---|---|---|---|---|---|
| Dry wt % | 44 | 44 | 11 | 0.5 | 0.5 |

The technical properties of the paper obtained with this fourth recipe are the following:

| Property | Unit | Value |
|---|---|---|
| Thickness | μm | 80 |
| Elongation Machine Direction | % | 2.1 |
| Elongation Cross Direction | % | 6.5 |
| Tensile Strength Machine Direction | KN/m | 5.8 |
| Tensile Strength Cross Direction | KN/m | 3.7 |
| Cobb Water Resistance wire side | gsm | 20 |
| Cobb Water Resistance felt side | gsm | 20 |
| Tear Machine Direction | g | 65 |
| Tear Cross Direction | g | 80 |

Fifth Recipe: Preparation of a Paper Having a Grammage of 34 Gsm.

According to this fifth recipe, a paper is made of the components listed in the table below:

| Component | First fibers (NBSK) | Second fibers (NBHK) | Starch | Precipitated Calcium Carbonate | Sizing Agent (AKD) | Wet Strength Agent (PAE) |
|---|---|---|---|---|---|---|
| Dry wt % | 47.2 | 47.2 | 0.66 | 1.5 | 2.1 | 1.3 |

It is also possible for this paper to be made with up to 20 wt % broke. As noted above, this lightweight paper also contains some Precipitated Calcium Carbonate (PCC), which may be added to the paper to increase opacity and/or add color or shade to the outer layer of the paper, which may be useful when forming a U-straw from the paper. The amount of PCC used in the paper is typically around 1-2 wt % when provided.

The technical properties of the paper obtained with this fifth recipe are the following:

| Property | Unit | Value |
|---|---|---|
| Thickness | μm | 44 |
| Elongation Machine Direction | % | 2.0% |
| Elongation Cross Direction | % | 4.2% |
| Tensile Strength Machine Direction | KN/m | 3.6 |
| Tensile Strength Cross Direction | KN/m | 1.2 |
| Wet burst | KPa | 37 |
| Cobb Water Resistance wire side | gsm | 14 |
| Cobb Water Resistance felt side | gsm | 15 |
| Tear Machine Direction | g | 28.1 |
| Tear Cross Direction | g | 34.3 |

In the following, some specific U-straws made from at least one layer of the paper described here-above are presented.

First U-Straw Embodiment: Made of Two Layers of Paper

This first U-straw made of two layers of the paper disclosed here-above. Those two layers paper are glued together with a food-compatible glue, such as for example the Aquence® CW21058 glue manufactured and sold by Henkel. More particularly, the U-straw is made of an inner layer and an outer layer. The inner layer is aimed at being in contact with the beverage during the use of the U-straw, and the outer layer is aimed at being in contact with the mouth of the user of the U-straw.

The inner layer is made of a paper as disclosed here-above having a grammage of 140 gsm. The paper constituting this inner layer is not calandered as there is no need to have a defined smoothness because of the fact that only the liquid (i.e. beverage) is aimed at being in contact with this paper. Accordingly, such U-straw is particularly designed for a use for non-sparkling beverages, such as fruit juices, for example.

On the other hand, the outer layer has a grammage of approximately 80 gsm. This outer layer is calandered in order to have a predetermined smoothness, and more particularly in order not to injure the mouth or the user of the U-straw. More particularly, the porosity of the paper forming the outer layer is comprised between 360 ml/min and 800 ml/min. Such porosity for the paper forming the outer layer enables this one to have the smoothness required to prevent any injury of the mouth of the user during the use of this U-straw disclosed in this first embodiment.

Second U-Straw Embodiment: Made of Three Layers of Paper

In another embodiment, the U-straw is made of three layers of the paper disclosed here-above, said layers being glued together with a food-compatible glue that might be the same than the one used in the first specific U-straw. More particularly, this U-straw is made of an inner layer aimed at being in contact with the beverage during the use of the U-straw, an outer layer aimed at being in contact with the mouth of the user during the use of the U-straw, and an intermediate layer sandwiched between the inner layer and the outer layer.

The inner layer can have a grammage of approximately 60 gsm. This inner layer can be calandered or not. More particularly, the inner layer can be calandered to provide this layer with a predetermined smoothness, and more particularly to a porosity comprised between 360 ml/min and 800 ml/min. If this U-straw is aimed at being used with sparkling beverages, it is preferable to have the inner layer calandered to prevent foaming phenomenon. However, in the case were this U-straw is aimed at being used for non-sparkling beverages, it is not necessary to have this inner layer calandered.

Moreover, the outer layer can have a thickness of approximately 60 gsm also. This outer layer is calandered to have a porosity comprised between 360 ml/min and 800 ml/min in order to have a smoothness preventing any injury of the mouth of the user as disclosed in the first U-straw embodiment.

The intermediate layer may have a grammage of 120 gsm. This intermediate layer is not calandered because there is no need to calander this intermediate layer. Indeed, this intermediate layer is only intended to provide the U-straw with a sufficient stiffness to prevent the collapsing of same for example when it is intended to be used to perforate a lid closing a beverage carton for example.

Thus, the obtention of a paper aimed at forming a U-straw which has properties enabling the formation of the accordion area and which is easy to process in a conventional installation, as well as having waterproofing properties compatible with a use in drinking straws without requiring the use of specific coatings like wax layers, said paper being directly printable and also biodegradable and environmental friendly is possible with the paper composition disclosed here-above. Indeed, the composition disclosed here-above enables the paper to have the mechanical and physical properties compatible enabling this paper to have the deformation required for forming the accordion part of the U-straw without tearing. Moreover, such composition prevents the tearing and the collapsing of the paper in wet conditions, making it also usable for the manufacturing of a U-straw.

The examples disclosed here-above correspond to specific embodiments and have to be interpreted as illustrative examples and not limitative ones. Indeed, the man skilled in the art can manufacture a U-straw having more than one, two or three layers as disclosed in the preferred embodiments disclosed here-above without exiting the scope of the present disclosure. Moreover, the man skilled in the art can use different grammages for the paper than the ones disclosed in the specific embodiments as long as this grammage stays between 30 and 140 gsm. Further, one skilled in the art is free to use another glue to enable the adhesion of the several layers as well as the formation of the U-straw as long as this glue is a food-compatible grade glue without exiting the scope of the present disclosures.

The invention claimed is:

1. A U-straw characterized in that it is made from at least one layer of a paper, wherein the paper comprises:
   between 10 and 50 dry wt % of first fibers having a length of between 1.4 mm and 2.5 mm;
   between 40 and 80 dry wt % of second fibers having a length of between 0.3 mm and 0.8 mm;
   between 1 and 6 dry wt % of a sizing agent; and
   starch, wherein the starch is present in the paper in an amount of at most 1 dry wt %;
   said paper having:
   an elongation in the Cross Direction of between 4 and 8%.

2. The U-straw according to claim 1, characterized in that the U-straw is made of three layers of the paper, said layers forming a laminate and being adhered together by a food-compatible glue.

3. The U-straw according to claim 2, characterized in that the U-straw is made of an outer layer having a grammage of 60 gsm, an inner layer having a grammage of 60 gsm and an intermediate layer having a grammage of 120 gsm, said intermediate layer being disposed between the inner and the outer layers.

4. The U-straw according to claim 3, characterized in that the paper forming the outer layer has a porosity comprised between 360 ml/min and 800 ml/min.

5. The U-straw according to claim 3, characterized in that the inner layer has a porosity comprised between 360 ml/min and 800 ml/min.

6. The U-straw according to claim 1, characterized in that it is made of two layers, respectively an inner layer and an outer layer of the paper.

7. The U-straw according to claim 6, characterized in that the U-straw is made of an outer layer having a grammage of 80 gsm and an inner layer having a grammage of 140 gsm.

8. The U-straw according to claim 6, characterized in that the outer layer has a porosity comprised between 360 ml/min and 800 ml/min.

9. The U-straw according to claim 1, wherein the first fibers are softwood fibers, and the second fibers are hardwood fibers.

10. The U-straw according to claim 9, wherein the softwood fibers comprise Northern Bleached Softwood Kraft or Southern Bleached Softwood Kraft pulp.

11. The U-straw according to claim 9, wherein the hardwood fibers comprise *Eucalyptus*, Northern Bleached Hardwood Kraft, or Southern Bleached Hardwood Kraft pulp.

\* \* \* \* \*